No. 700,426. Patented May 20, 1902.
I. W. KEITHLEY.
BICYCLE.
(Application filed Oct. 18, 1897.)

(No Model.) 2 Sheets—Sheet I.

Witnesses.
W. J. Baldwin
E. M. Healy

Inventor.
I. W. Keithley.
By
Southgate & Southgate
Attorneys.

No. 700,426. Patented May 20, 1902.
I. W. KEITHLEY.
BICYCLE.
(Application filed Oct. 18, 1897.)
(No Model.) 2 Sheets—Sheet 2.
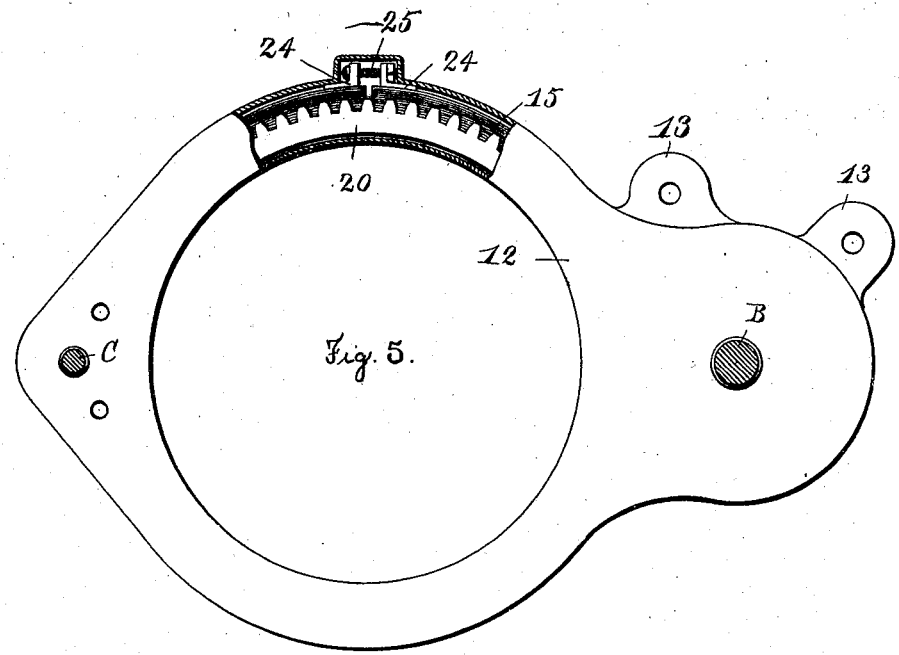
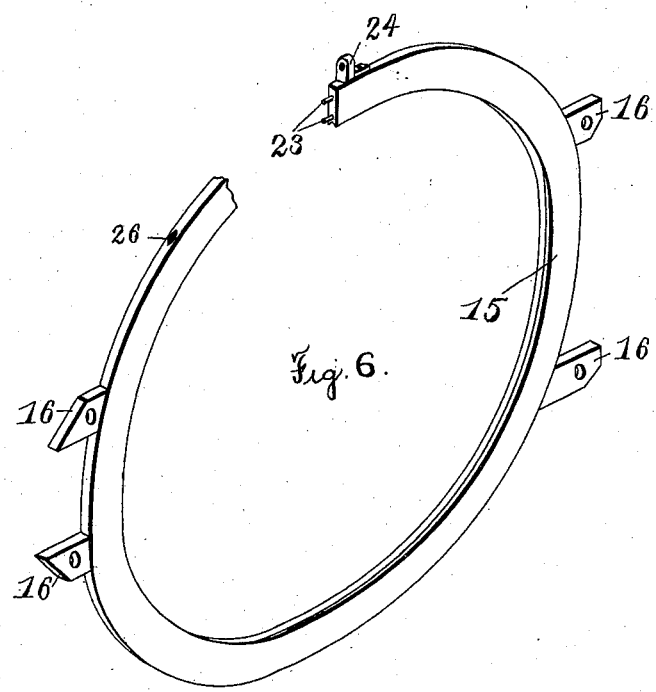
Witnesses.
W. J. Baldwin
E. M. Healy
Inventor.
I. W. Keithley.
By
Southgate & Southgate
Attorneys.

UNITED STATES PATENT OFFICE.

IRVING W. KEITHLEY, OF WORCESTER, MASSACHUSETTS.

BICYCLE.

SPECIFICATION forming part of Letters Patent No. 700,426, dated May 20, 1902.

Application filed October 18, 1897. Serial No. 655,543. (No model.)

*To all whom it may concern:*

Be it known that I, IRVING W. KEITHLEY, a citizen of the United States, residing at Worcester, in the county of Worcester and State of Massachusetts, have invented a new and useful Improvement in Bicycles, of which the following is a specification.

My invention relates to an improved driving mechanism for bicycles; and the object of my invention is to provide a train of spur-toothed gearing for connecting the crank-axle of a bicycle with the rear wheel, said train of gearing comprising an intermediate rim-gear which is journaled inside of a supporting-ring. The working faces of the gears are preferably grooved or cut away to receive the supporting-ring, and the intermediate rim-gear is preferably supported by a single set of bearing-balls.

Figure 1:
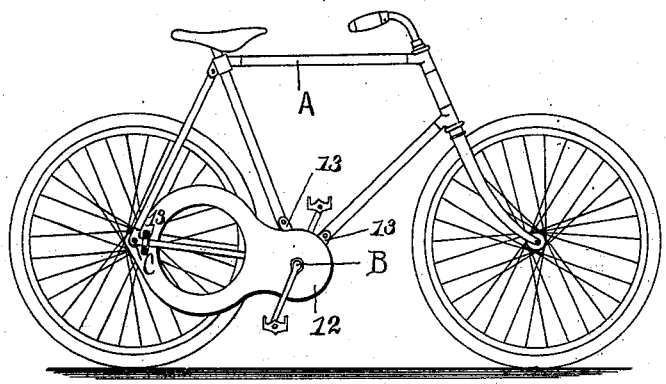
Figure 2:
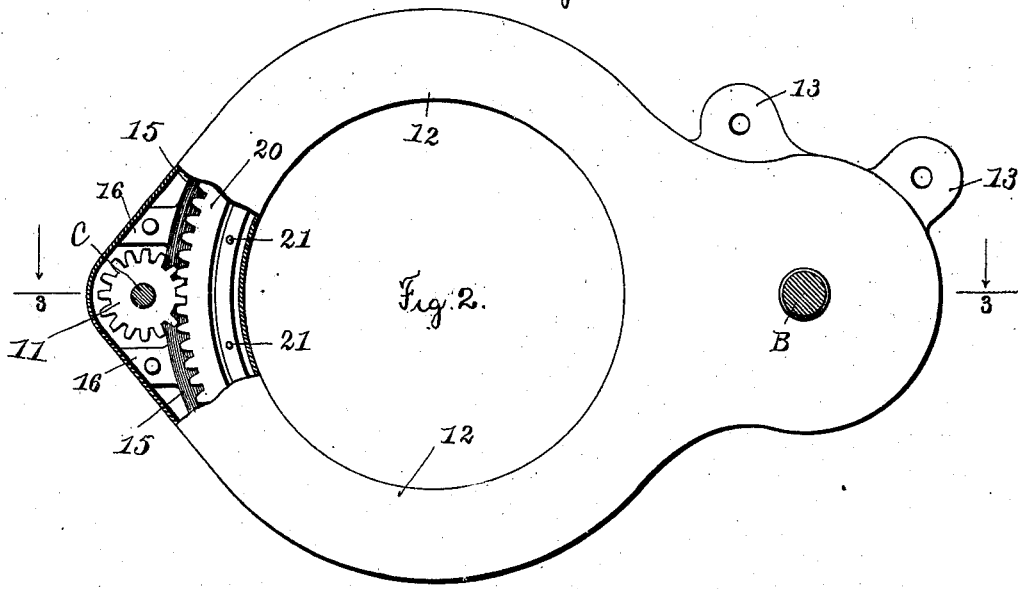
Figure 3:
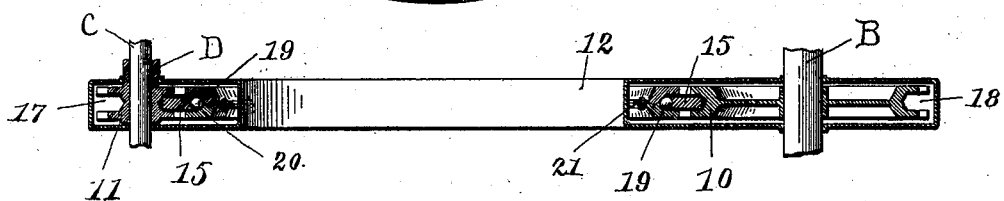
Figure 4:
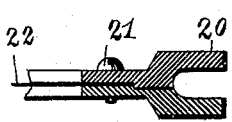

In the accompanying two sheets of drawings, Figure 1 is a side view of a bicycle provided with a driving mechanism constructed according to my invention. Fig. 2 is an enlarged side view, partially broken away, illustrating the driving mechanism. Fig. 3 is a sectional view taken on the line 3 3 of Fig. 2. Fig. 4 is an enlarged detail view of the intermediate gear. Fig. 5 is a side view, partially broken away, illustrating a slightly-modified form of construction; and Fig. 6 is an enlarged perspective view of the supporting-ring.

A driving mechanism for bicycles constructed according to my invention comprises a spur-toothed gear secured to the crank-axle, a driven gear turning with the rear wheel, and an intermediate or connecting gear which is made in the form of a rim. My construction has been especially designed with a view of journaling the intermediate or rim gear so that the same will have the least possible amount of friction and so that it will be supported substantially at the points where strains are imparted thereto. To these ends the working faces of the gears are preferably divided into two sections or are grooved to receive the supporting-ring for the intermediate gear. By means of this construction I have provided a simple and compact driving mechanism which may be inclosed in a substantially dust-proof casing, the arrangement of the bearings enabling me to employ a large number of bearing-balls, which will distribute the wear, and as the bearing-balls are located substantially at the points where strains are imparted to the intermediate gear there will be little tendency for the gears to bind or cramp.

In order to provide means for adjusting the bearing of the intermediate or rim gear, said rim-gear may be made in two sections which are adjustably connected together, or, if preferred, the intermediate gear may be made of a single piece and an adjusting means may be applied to the supporting-ring.

Referring to the drawings and in detail, A designates a bicycle-frame, which may be of any of the ordinary or approved constructions. The crank-shaft B is journaled in the frame A in the ordinary manner, and the axle C of the rear wheel is preferably secured rigidly in the framework A. Secured on the crank-shaft B is a driving-gear 10. Journaled on the axle C is a gear 11, which is fastened to or formed integrally with the hub D of the rear wheel. A casing 12, which may be made substantially dust-proof, incloses the gearing and may be secured to the frame of the machine, as by means of the lugs or straps 13. The gears 10 and 11 have their working faces divided or are circumferentially grooved, as at 18 and 17, to receive the supporting-ring 15. The ring 15 may be secured rigidly to the frame of the machine or may be fastened to the casing 12, as by means of the lugs 16.

The intermediate gear 20, which connects the gears 10 and 11, is made in the form of a rim and is journaled on a single set of bearing-balls 19 inside of the supporting-ring 15. As illustrated in Figs. 1 to 4, the intermediate rim-gear 20 may be made from two sections, which are turned to fit accurately together, said sections being fastened together by means of screws 21.

In order to permit an adjustment for taking up wear, a number of thicknesses of paper or other thin material, as 22, may be interposed between the sections of the rim-gear 20, the adjustment of the bearing depending on the number of thicknesses of paper 22 employed.

In some cases instead of an intermediate rim-gear 20 made from two sections I contemplate employing a solid rim-gear, which may be mounted inside of a split supporting-ring, and I have illustrated such a construction in Figs. 5 and 6. As shown in these figures, the supporting-ring 15 is divided or split and is provided with dowel-pins 23 for keeping its ends in alinement. Secured on the supporting-ring are lugs 24 for receiving an adjusting-screw 25. In assembling this form of construction the supporting-ring 15 may be twisted or sprung open sufficiently to receive the rim-gear 20 and its bearing-balls, or, if preferred, the bearing-balls can be inserted through a hole or socket 26.

One especial advantage in a driving-gear constructed according to my invention resides in the fact that the casing 12 may be cut away or shaped so that it will present comparatively little wind-surface.

I am aware that changes may be made in the construction of bicycles by those who are skilled in the art without departing from the scope of my invention as expressed in the claims. I do not wish, therefore, to be limited to the forms which I have shown and described; but What I do claim, and desire to secure by Letters Patent of the United States, is—

1. In a bicycle, the combination of a crank-shaft gear, a rear-wheel gear, an intermediate rim-gear connecting the crank-shaft gear and rear-wheel gear, said gears having their working faces grooved to receive a supporting-ring, which supporting-ring incloses the intermediate gear, substantially as described.

2. In a bicycle, the combination of a grooved crank-shaft gear 10, a grooved rear-wheel gear 11, a supporting-ring 15 engaging said grooves, a rim-gear 20 journaled on a single set of bearing-balls 19 inside of the supporting-ring 15, and an open-centered casing 12 inclosing said gearing, substantially as described.

3. In a bicycle, the combination of a grooved crank-shaft gear 10, a grooved rear-wheel gear 11, a supporting-ring 15 engaging the grooves in said gears, a rim-gear 20 journaled on a single set of bearing-balls inside of the supporting-ring 15, means for adjusting said supporting-ring 15 to take up wear, and an open-centered casing 12 inclosing said gearing, substantially as described.

In testimony whereof I have hereunto set my hand in the presence of two subscribing witnesses.

IRVING W. KEITHLEY.

Witnesses:
 LOUIS W. SOUTHGATE,
 PHILIP W. SOUTHGATE.